United States Patent
Chang et al.

(10) Patent No.: US 8,115,881 B2
(45) Date of Patent: Feb. 14, 2012

(54) VOLTAGE PULL-DOWN CIRCUIT

(75) Inventors: Lee-Hsun Chang, Hsinchu (TW);
Shu-Fen Tsai, Hsinchu (TW); Yu-Wen Lin, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 130 days.

(21) Appl. No.: 12/510,250

(22) Filed: Jul. 27, 2009

(65) Prior Publication Data

US 2009/0284884 A1    Nov. 19, 2009

Related U.S. Application Data

(62) Division of application No. 11/780,489, filed on Jul. 20, 2007, now Pat. No. 7,791,678.

(30) Foreign Application Priority Data

Apr. 25, 2007   (TW) ................................ 96114547 A

(51) Int. Cl.
  *G02F 1/1333*   (2006.01)

(52) U.S. Cl. .......................................................... 349/40
(58) Field of Classification Search .................. None
  See application file for complete search history.

(56) References Cited

U.S. PATENT DOCUMENTS

| | | | |
|---|---|---|---|
| 6,337,722 B1 * | 1/2002 | Ha ................................ | 349/40 |
| 6,862,013 B2 * | 3/2005 | Takeuchi et al. ............... | 345/92 |
| 7,298,165 B2 * | 11/2007 | Chang et al. ............ | 324/760.02 |
| 7,561,230 B2 * | 7/2009 | Yoshii ........................... | 349/110 |
| 7,629,614 B2 * | 12/2009 | Liao .............................. | 257/72 |
| 2004/0041774 A1 * | 3/2004 | Moon ............................ | 345/99 |
| 2005/0190168 A1 * | 9/2005 | Jiang et al. .................... | 345/204 |
| 2006/0002045 A1 * | 1/2006 | Kobashi ...................... | 361/91.1 |
| 2008/0253043 A1 * | 10/2008 | Wu et al. ....................... | 361/56 |

* cited by examiner

*Primary Examiner* — Sung Pak
(74) *Attorney, Agent, or Firm* — Jianq Chyun IP Office

(57) ABSTRACT

A voltage pull-down circuit electrically connected between two scan lines and a bus line includes a transistor and an electrostatic discharge protection device. Each transistor comprises a source, a drain, and a gate electrically connected to one of the scan lines. Each gate is connected to another scan line, the source, and the drain through the electrostatic discharge protection device.

5 Claims, 4 Drawing Sheets

VOLTAGE PULL-DOWN CIRCUIT

CROSS-REFERENCE TO RELATED APPLICATION

This application is a divisional application of and claims the priority benefit of U.S. application Ser. No. 11/780,489, filed on Jul. 20, 2007, now pending, which claims the priority benefit of Taiwan application serial no. 96114547, filed on Apr. 25, 2007. The entirety of each of the above-mentioned patent applications is hereby incorporated by reference herein and made a part of this specification.

BACKGROUND OF THE INVENTION

1. Field of the Invention

The present invention relates to a liquid crystal display (LCD), and more particularly to an active device array substrate.

2. Description of Related Art

In recent years, since an optoelectronic technology and a semiconductor device manufacturing technology become more mature, flat panel displays have been accordingly developed. Among the flat panel displays, a liquid crystal display (LCD) is widely adopted to gradually replace a conventional CRT display and has become a main stream of displays on the market due to its advantages of low operation voltage, radiation free, light weight, small volume occupancy, and so forth.

A thin film transistor liquid crystal display (TFT-LCD) is taken for an example. The TFT-LCD includes an active device array substrate, an opposite substrate disposed above the active device array substrate, a liquid crystal layer sandwiched between the active device array substrate and the opposite substrate, a gate driving circuit and a source driving circuit. The gate driving circuit and the source driving circuit are electrically connected with scan lines and data lines, respectively. Each pixel in the TFT-LCD is controlled by the corresponding TFT, and the TFT is electrically connected to the corresponding scan line and the corresponding data line.

As the TFT-LCD performs a display function, the gate driving circuit sequentially provides scan signals to each scan line, so as to turn on the TFTs in the pixels controlled by each scan line in sequence. As the TFTs controlled by each scan line are turned on, a data voltage provided by the source driving circuit is inputted into the pixels. It should be noted that when the TFTs of the pixels controlled by one scan line are turned on, the TFTs of the pixels controlled by the previous scan line should be turned off for sure, so as to avoid the data voltage from being inputted to the pixels controlled by the previous scan line. However, with an increasing demand on large-size and high-resolution TFT-LCDs, the number of the pixels controlled by each of the scan lines on the active device array substrate is increased, such that gate delay effect occurring in each of the scan lines is exaggerated.

To resolve said issue of the gate delay effect, several solutions have been proposed by the related art. One of the solutions is to install a voltage pull-down circuit on each of the scan lines. For example, the voltage pull-down circuit as depicted in FIG. 1 is able to improve the gate delay effects. Referring to FIG. 1, a voltage pull-down circuit 10 is electrically connected to a scan line $S_n$, a next scan line $S_{n+1}$ and a bus line 12 having a gate-off voltage level $V_{gl}$. As the pixels controlled by the next scan line $S_{n+1}$ are turned on, a gate-on voltage level $V_{gh}$ of the scan line $S_n$ is rapidly pulled down to the gate-off voltage level $V_{gl}$ through the voltage pull-down circuit 10. Thereby, the issue arisen from the gate delay effect can be effectively resolved.

However, during a process of fabricating the LCD, as the voltage pull-down circuit is damaged by electrostatic discharge (e.g. charges generated by a plasma which is used in a thin film deposition or a dry etching, the charges generated by an alignment rubbing process, or the charges generated from conducting a charge test on a substrate), the voltage pull-down circuit may not function, leading to occurrence of line defect.

SUMMARY OF THE INVENTION

In view of the foregoing conventional issues, the present invention is directed to an active device array substrate capable of improving gate delay defects.

The present invention provides an active device array substrate including a plurality of scan lines, a plurality of data lines, a plurality of pixels, a bus line and a plurality of voltage pull-down circuits all disposed on a substrate. The pixels are disposed on intersections of the scan lines and the data lines, arranged in array on the substrate, and electrically connected to the scan lines and the data lines correspondingly. Each of the voltage pull-down circuits electrically connected between the scan line and the bus line correspondingly includes a transistor and an electrostatic discharge protection device. Each transistor includes a source, a drain, and a gate electrically connected to a next scan line. Each gate is electrically connected to the scan line, the source, the drain and the bus line correspondingly through the electrostatic discharge protection device.

The present invention further provides an LCD including said active device array substrate, an opposite substrate, a sealant and a liquid crystal layer. The opposite substrate is disposed above the active device array substrate. The sealant is disposed between the active device array substrate and the opposite substrate, so as to form a liquid crystal injection space between the active device array substrate and the opposite substrate. The liquid crystal layer is disposed in the liquid crystal injection space.

The present invention further provides a voltage pull-down circuit adapted to be electrically connected between two scan lines and a bus line. The voltage pull-down circuit includes a transistor and an electrostatic discharge protection device. Each transistor has a source, a drain, and a gate electrically connected to one of the scan lines, and each gate is connected to another scan line, the source and the drain through the electrostatic discharge protection device.

According to an embodiment of the present invention, each transistor includes a TFT.

According to an embodiment of the present invention, each electrostatic discharge protection device includes a first diode and a second diode. The first diode is connected between the gate and the corresponding scan line, while the second diode is connected between the gate and the bus line. According to other embodiments, each electrostatic discharge protection device further includes a first capacitor electrically connected to the first diode in series and a second capacitor electrically connected to the second diode in series.

According to an embodiment of the present invention, each electrostatic discharge protection device includes a first capacitor and a second capacitor. The first capacitor is connected between the gate and the corresponding scan line, while the second capacitor is connected between the gate and the bus line.

According to an embodiment of the present invention, each of the voltage pull-down circuits is electrically connected between the bus line and an end of one of the scan lines.

According to an embodiment of the present invention, the active device array substrate further includes a gate driving circuit disposed on the substrate and electrically connected to the scan lines.

According to an embodiment of the present invention, each of the voltage pull-down circuits is disposed below the sealant.

According to an embodiment of the present invention, the bus line is disposed below the sealant.

According to an embodiment of the present invention, the LCD further includes a plurality of spacers disposed in the liquid crystal injection space. By contrast, in other embodiments, the voltage pull-down circuit is disposed below the spacers.

Based on the above, the present invention is able to reduce the gate delay effect occurring in the active device array substrate through disposing the voltage pull-down circuit. Moreover, the voltage pull-down circuit of the present invention is equipped with a function of electrostatic discharge protection, such that the voltage pull-down circuit can be prevented from damaging due to electrostatic discharge. Therefore, the display quality of the LCD is improved.

In order to make the aforementioned and other objects, features and advantages of the present invention more comprehensible, several embodiments accompanied with figures are described in detail below.

DESCRIPTION OF EMBODIMENTS

Figure 1:
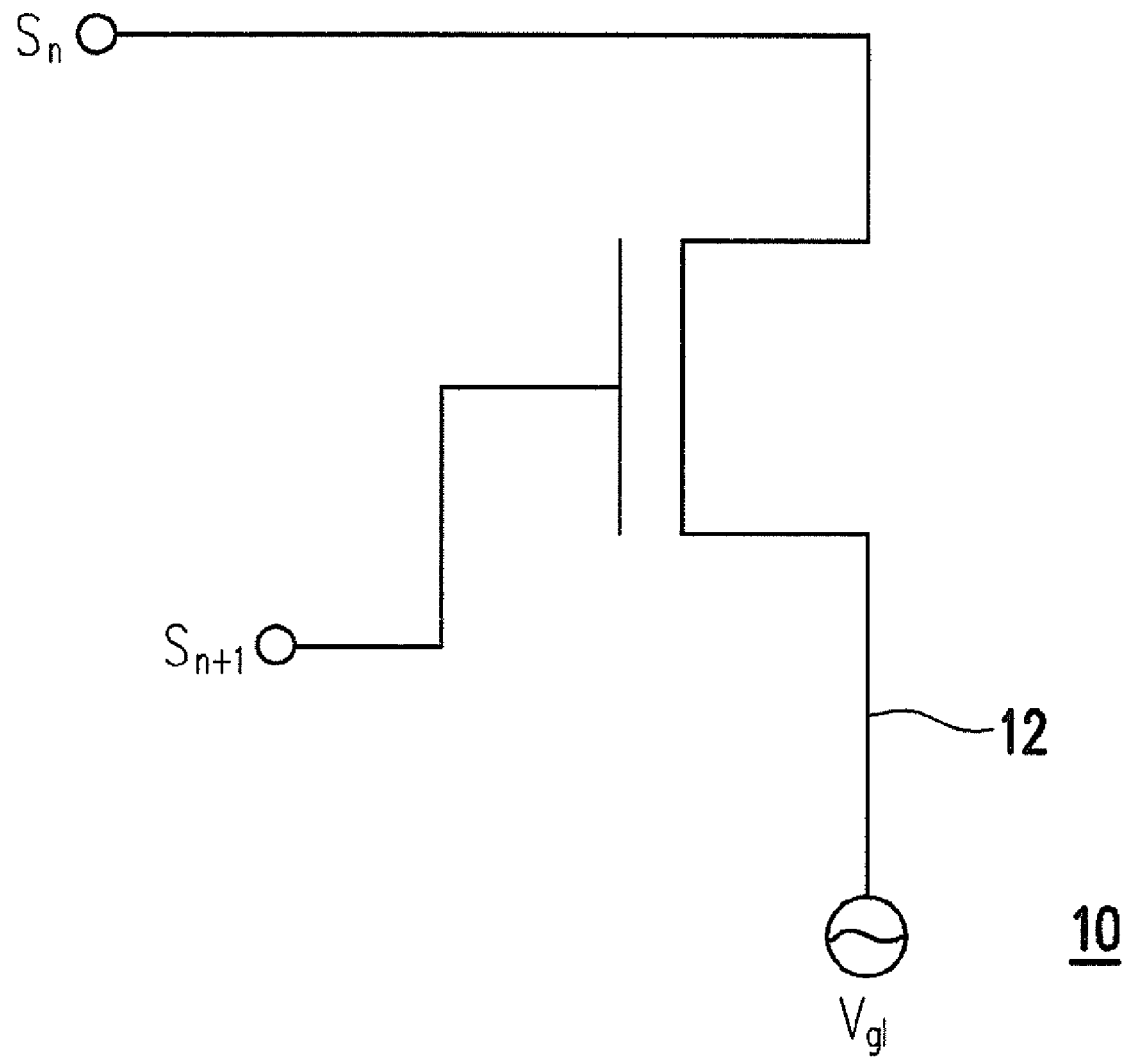
FIG. 1 illustrates a voltage pull-down circuit for improving a gate delay effect occurring in a scan line according to the related art.
Figure 2:
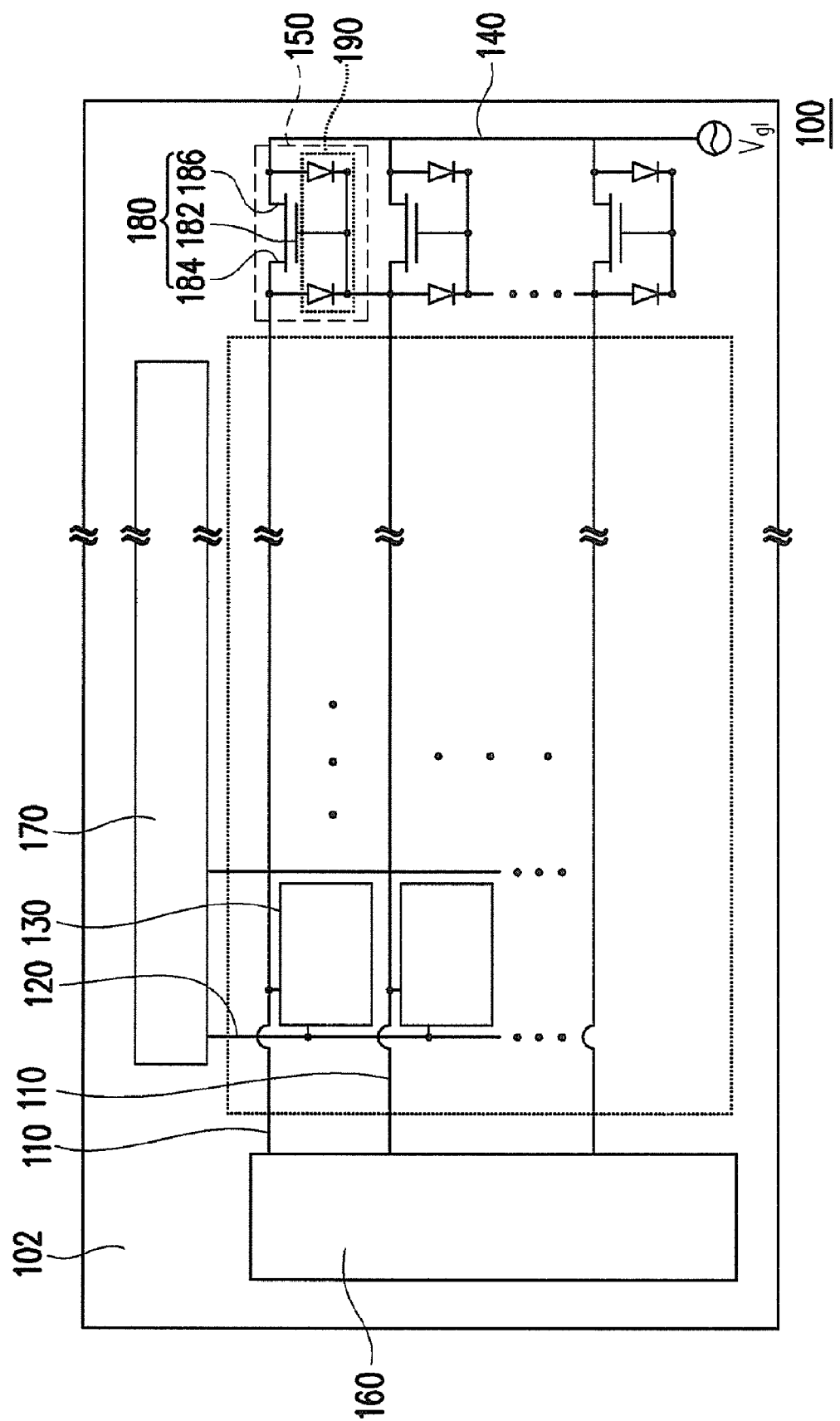
FIG. 2 is a schematic view of an active device array substrate according to an embodiment of the present invention.

FIG. 2 is a schematic view of an active device array substrate according to an embodiment of the present invention. Referring to FIG. 2, an active device array substrate 100 includes a plurality of scan lines 110, a plurality of data lines 120, a plurality of pixels 130, a bus line 140 and a plurality of voltage pull-down circuits 150 all disposed on a substrate 102. The pixels 130 are arranged in array on the substrate 102, and are electrically connected to the scan lines 110 and the data lines 120 correspondingly. In the present embodiment, the active device array substrate 100 further includes a gate driving circuit 160 electrically connected to the scan lines 110 and a source driving circuit 170 electrically connected to the data lines 120. Each of the voltage pull-down circuits 150 including a transistor 180 and an electrostatic discharge protection device 190 is electrically connected between the scan line 110 and the bus line 140 correspondingly. In the present embodiment, the transistor 180 is, for example, a TFT, while the transistor 180 may be in other types or forms. As shown in FIG. 2, each transistor 180 includes a source 184, a drain 186, and a gate 182 electrically connected to a next scan line 110. Each gate 182 is electrically connected to the scan line 110, the source 184, the drain 186 and the bus line 140 correspondingly through the electrostatic discharge protection device 190. In FIG. 2, the source 184 is connected to the corresponding scan line 110, while the drain 186 is connected to the bus line 140.

In general, a scan signal provided by the gate driving circuit 160 has two levels of voltage $V_{gh}$ and $V_{gl}$. As the scan signal is $V_{gh}$, the pixels 130 controlled by the scan line 110 are turned on. As the scan signal is $V_{gl}$, the pixels 130 controlled by the scan line 110 are turned off According to the present embodiment, the bus line 140 is coupled to the voltage level $V_{gl}$, and thereby the voltage level of the scan line 110 corresponding to the voltage pull-down circuit 150 is rapidly pulled down to $V_{gl}$ when the pixels 130 controlled by the next scan line 110 are turned on, so as to reduce a gate delay. In detail, as the scan signal of the next scan line 110 is $V_{gh}$, the transistor 180 of each of the voltage pull-down circuits 150 is turned on, such that the corresponding scan line 110 and the bus line 140 are electrically conducted. As such, the levels of voltage of the corresponding scan line 110 and the bus line 140 are both $V_{gl}$ for turning off the pixels 130 controlled by the corresponding scan line 110. On the other hand, each of the voltage pull-down circuits 150 in the present embodiment is disposed at one side opposite to the other side at which the gate driving circuit 160 is disposed and is electrically connected to the bus line 140 and an end of one of the scan lines 110. In other embodiments, however, each of the voltage pull-down circuits 150 may be disposed at the same side as the gate driving circuit 160 is disposed.

In comparison with a design of the conventional voltage pull-down circuit, it should be noted that the electrostatic discharge protection device 190 is disposed in each of the voltage pull-down circuits 150 for preventing the voltage pull-down circuits 150 from being damaged by electrostatic discharge according to the present invention. The disposition of the electrostatic discharge protection device 190 is able to not only protect each of the voltage pull-down circuits 150 but also protect all the devices electrically connected to each of the scan lines 110 in the active device array substrate 100. Said devices protected by the electrostatic discharge protection device 190 include the pixels 130 corresponding to each of the scan lines 110, the gate driving circuit 160, wires connected with the gate driving circuit 160, or the like. As such, dot defects or line defects of the active device array substrate 100 can be improved.

Figure 3A:
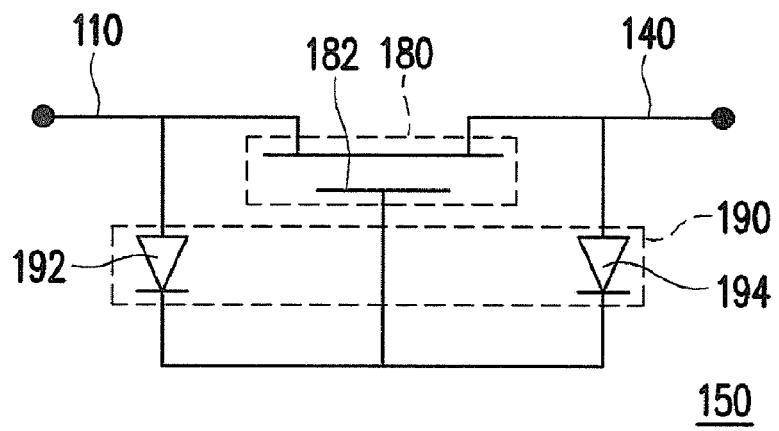
FIG. 3A is a schematic view of an electrostatic discharge protection device according to a first embodiment of the present invention.

FIG. 3A is a schematic view of an electrostatic discharge protection device according to an embodiment of the present invention. Referring to FIG. 3A, each electrostatic discharge protection device 190 includes a first diode 192 and a second diode 194. The first diode 192 is connected between the gate 182 and the corresponding scan line 110, and the second diode 194 is connected between the gate 182 and the bus line 140. Each electrostatic discharge protection device 190 may also be formed by the first diode 192 exclusively based on actual demands. The number of components of each of the electrostatic discharge protection devices 190 is not limited in the present invention.

With reference to FIG. 3A, each of the first diodes 192 and each of the second diodes 194 are turned off under normal operation and do not affect the operation of each of the voltage pull-down circuits 150. However, as a positive static charge is generated on the active device array substrate 100, the positive static charge turns on the first diode 192 and the corresponding transistor 180 through the corresponding scan line 110, such that the positive static charge can be rapidly released through the bus line 140, and that the transistor 180 can be prevented from being damaged by electrostatic discharge.

Figure 3B:
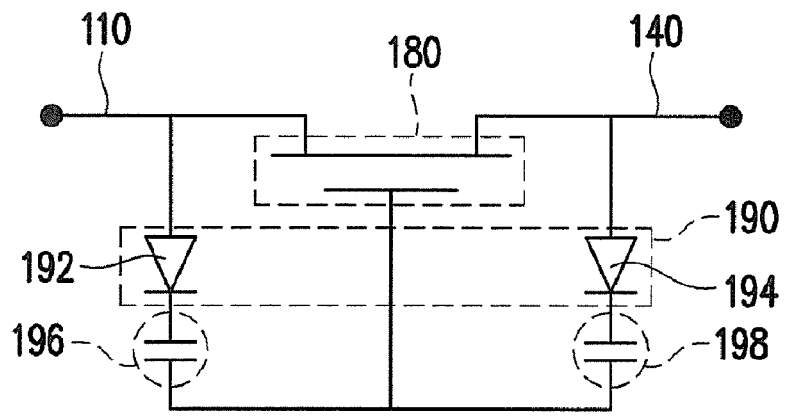
FIG. 3B is a schematic view of an electrostatic discharge protection device according to a second embodiment of the present invention.

In addition to the diodes serving as the electrostatic discharge protection device 190, capacitors electrically connected to the diodes in series can also be employed as the electrostatic discharge protection device 190 based on actual demands. As indicated in FIG. 3B, the first diode 192 is electrically connected to the first capacitor 196 in series, and the second diode 194 is electrically connected to the second capacitor 198 in series, so as to increase a voltage differential when the electrostatic discharge protection device 190 is turned off and when the electrostatic discharge protection device 190 is turned on. Thereby, a malfunction of the electrostatic discharge protection device 190 can be prevented.

Figure 3C:
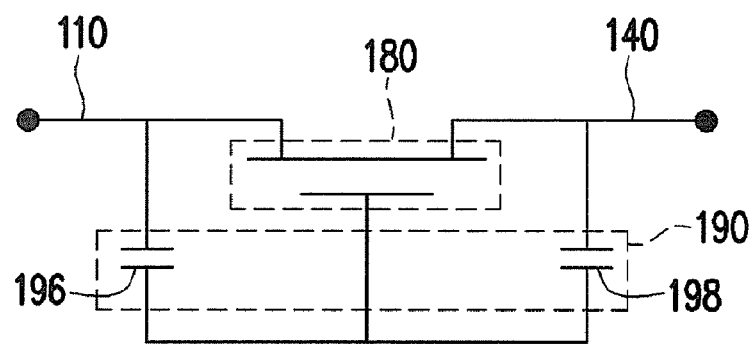
FIG. 3C is a schematic view of an electrostatic discharge protection device according to a third embodiment of the present invention.

FIG. 3C is a schematic view of an electrostatic discharge protection device according to another embodiment of the present invention. As illustrated in FIG. 3C, the electrostatic discharge protection device 190 includes the first capacitor 196 and the second capacitor 198. The first capacitor 196 is connected between the gate 182 and the corresponding scan line 110, while the second capacitor 198 is connected between the gate 182 and the bus line 140. The electrostatic discharge protection device 190 may also be formed by the first capacitor 196 exclusively based on actual demands. The number of the components of each of the electrostatic discharge protection devices 190 is not limited in the present invention.

According to the present invention, the types of the electrostatic discharge protection device 190 are not restricted to those described in said three embodiments. The electrostatic discharge protection device 190 may be the diode, the capacitor, the transistor or a combination thereof.

Figure 4:
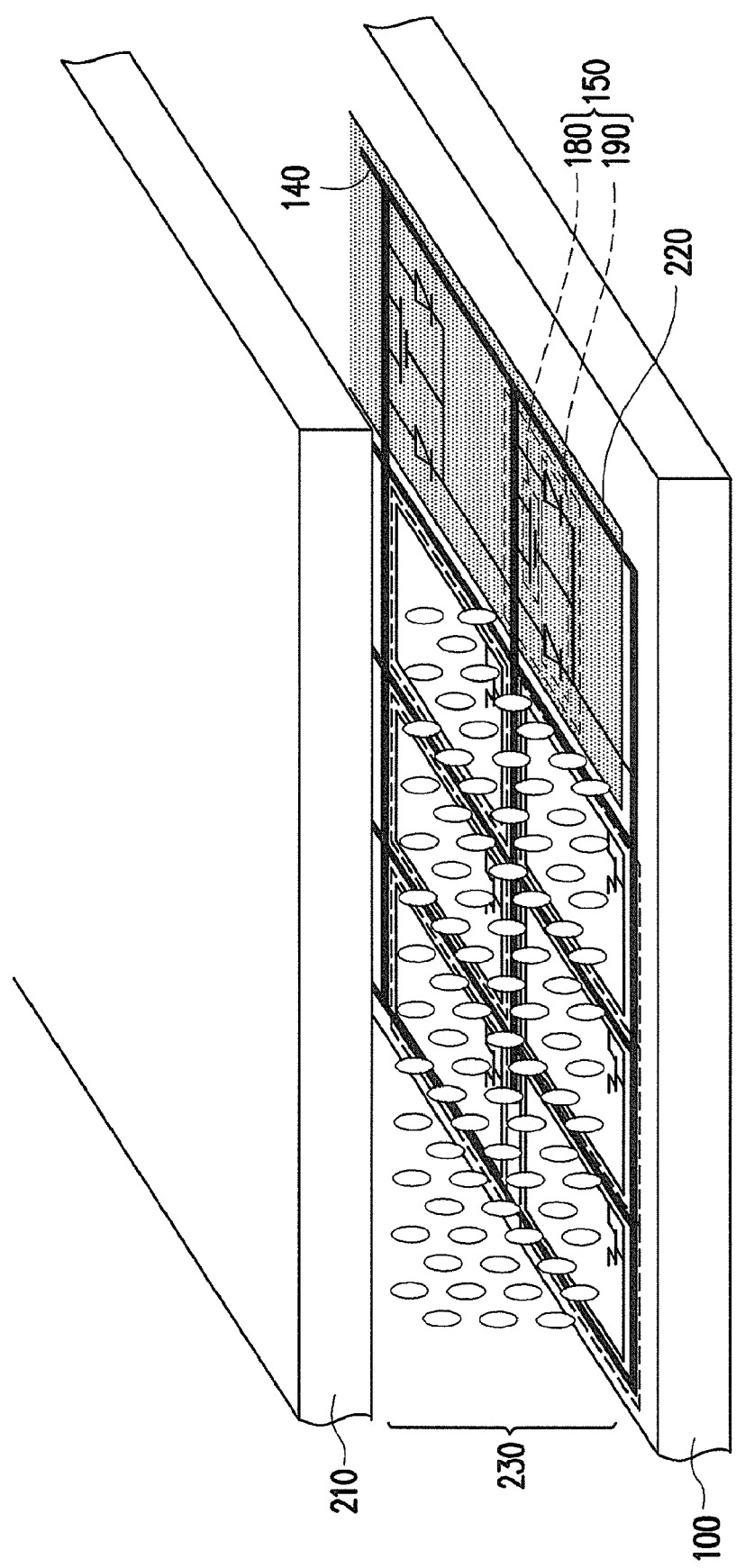
FIG. 4 is a schematic view of an LCD according to an embodiment of the present invention.

FIG. 4 is a schematic view of an LCD according to an embodiment of the present invention. Referring to FIG. 4, an LCD 200 includes the active device array substrate 100, an opposite substrate 210, a sealant 220 and a liquid crystal layer 230. The opposite substrate 210 is disposed above the active device array substrate 100. The sealant 220 is disposed between the active device array substrate 100 and the opposite substrate 210, so as to form a liquid crystal injection space between the active device array substrate 100 and the opposite substrate 210. The liquid crystal layer 230 is disposed in the liquid crystal injection space. Note that the voltage pull-down circuit 150, the bus line 140 or the both can be alternatively disposed below the sealant 220, such that the voltage pull-down circuit 150 and/or the bus line 140 do not affect orientation of liquid crystal molecules disposed thereabove, and that light leakage of the LCD 200 can be improved. In addition, capacitive loading of the LCD 200 can be reduced by disposing the voltage pull-down circuit 150 and/or the bus line 140 below the sealant 220, enhancing performance of the transistor 180 and the electrostatic discharge protection device 190 of each voltage pull-down circuit 150.

To sum up, the voltage pull-down circuit of the present invention is not only able to reduce the gate delay but also to prevent damages arisen from electrostatic discharge. Accordingly, the voltage pull-down circuit provided by the present invention can improve yield of the LCD products and extend lifetime thereof.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A voltage pull-down circuit electrically connected between two scan lines and a bus line, wherein the two scan lines comprises a first scan line and a second scan line, the voltage pull-down circuit comprising:
    a transistor; and
    an electrostatic discharge protection device, wherein each transistor comprises a source, a drain, and a gate electrically connected to the second scan line, wherein a voltage level of the gate is substantially the same as that of the second scan line, and each gate is connected to the first scan line, the source and the drain through the electrostatic discharge protection device.

2. The voltage pull-down circuit as claimed in claim 1, wherein each transistor comprises a TFT.

3. The voltage pull-down circuit as claimed in claim 1, wherein each electrostatic discharge protection device comprises:
    a first diode connected between the gate and the corresponding scan line; and
    a second diode connected between the gate and the bus line.

4. The voltage pull-down circuit as claimed in claim 3, wherein each electrostatic discharge protection device further comprises:
    a first capacitor electrically connected to the first diode in series; and
    a second capacitor electrically connected to the second diode in series.

5. The voltage pull-down circuit as claimed in claim 1, wherein each electrostatic discharge protection device comprises:
    a first capacitor connected between the gate and the corresponding scan line; and
    a second capacitor connected between the gate and the bus line.

* * * * *